US009007041B2

(12) United States Patent
Lee et al.

(10) Patent No.: US 9,007,041 B2
(45) Date of Patent: Apr. 14, 2015

(54) CONTROLLER FOR PROTECTIVELY REDUCING AN OUTPUT OF A CONVERTING CIRCUIT

(71) Applicant: Green Solution Technology Co., Ltd., New Taipei (TW)

(72) Inventors: Li-Min Lee, New Taipei (TW); Chung-Che Yu, New Taipei (TW); Shian-Sung Shiu, New Taipei (TW); Quan Gan, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 288 days.

(21) Appl. No.: 13/693,990

(22) Filed: Dec. 4, 2012

(65) Prior Publication Data

US 2014/0152274 A1 Jun. 5, 2014

(51) Int. Cl.
G05F 1/565 (2006.01)
G05F 1/595 (2006.01)

(52) U.S. Cl.
CPC ..................... G05F 1/595 (2013.01)

(58) Field of Classification Search
USPC ................................. 323/271–289
See application file for complete search history.

(56) References Cited

U.S. PATENT DOCUMENTS

| | | | | |
|---|---|---|---|---|
| 5,481,178 A * | 1/1996 | Wilcox et al. | | 323/287 |
| 6,430,070 B1 * | 8/2002 | Shi et al. | | 363/97 |
| 6,788,038 B1 * | 9/2004 | Bell et al. | | 323/284 |
| 7,019,507 B1 * | 3/2006 | Dittmer et al. | | 323/284 |
| 7,741,820 B2 * | 6/2010 | Huang et al. | | 323/271 |
| 7,791,327 B2 * | 9/2010 | Liu | | 323/285 |
| 7,868,595 B1 * | 1/2011 | Smith | | 323/222 |
| 8,368,433 B2 * | 2/2013 | Lee et al. | | 327/109 |
| 8,629,630 B2 * | 1/2014 | Shiu et al. | | 315/307 |
| 2002/0024328 A1 * | 2/2002 | Balakrishnan et al. | | 323/283 |
| 2008/0074094 A1 * | 3/2008 | Brenden et al. | | 323/282 |
| 2009/0009148 A1 * | 1/2009 | Philbrick | | 323/282 |
| 2010/0315017 A1 * | 12/2010 | Yu et al. | | 315/291 |
| 2012/0049829 A1 * | 3/2012 | Murakami | | 323/288 |
| 2012/0104968 A1 * | 5/2012 | Shiu et al. | | 315/291 |
| 2012/0153921 A1 * | 6/2012 | Brokaw | | 323/288 |
| 2012/0268085 A1 * | 10/2012 | Lee et al. | | 323/234 |
| 2012/0274235 A1 * | 11/2012 | Lee et al. | | 315/297 |
| 2013/0271097 A1 * | 10/2013 | Lee et al. | | 323/271 |

* cited by examiner

*Primary Examiner* — Adolf Berhane
*Assistant Examiner* — Nusrat Quddus
(74) *Attorney, Agent, or Firm* — Muncy, Geissler, Olds & Lowe, P.C.

(57) ABSTRACT

A controller for protectively reducing an output of a converting circuit includes a feedback circuit, a logic control circuit, an over-state judgment circuit, and a protection control circuit, is disclosed. The feedback circuit generates a modulation signal according to an output of a converting circuit. The logic control circuit is coupled to the feedback circuit and controls the converting circuit according to the modulation signal for stabilizing the output of the converting circuit. The over-state judgment circuit receives an over-state reference signal and a detecting signal, and generates a protection signal in response to levels of the detecting signal and the over-state reference signal. The protection control circuit is coupled to the logic control circuit and the over-state judgment circuit and controls the logic control circuit to lower the output of the converting circuit when receiving the protection signal.

14 Claims, 3 Drawing Sheets

US 9,007,041 B2

CONTROLLER FOR PROTECTIVELY REDUCING AN OUTPUT OF A CONVERTING CIRCUIT

BACKGROUND OF THE INVENTION (1) Field of the Invention

The present invention relates to a controller, and more particularly relates to a controller for protectively reducing an output of a converting circuit.

(2) Description of the Prior Art

The conventional power management Integrated Circuits (ICs) immediately stop operating and execute a latching protection for avoiding damage to the integrated circuits and systems and further ensuring the safety and reliability of integrated circuits when judging that the system operates abnormally to trigger a corresponding protection mechanism, such as over-temperature protection, over-voltage protection, under-voltage protection, over-current protection and so on.

FIG. 1 is a schematic diagram of a conventional DC-DC buck converter. The DC-DC buck converter comprises a controller and a converting circuit. The controller comprises a feedback circuit 10, an over-voltage judgment circuit 15, a logic control circuit 20 and a latch protection circuit 25. The converting circuit comprises a high-side transistor switch SW1, a low-side transistor switch SW2, an inductance L and an output capacitance C. The high-side transistor switch SW1 and the low-side transistor switch SW2 are connected in series. One end of the high-side transistor switch SW1 is coupled to an input voltage Vin, and the other end thereof is coupled to one terminal of the inductance L and one end of the low-side transistor switch SW2. The other end of the low-side transistor switch SW2 is grounded. The other terminal of the inductance L is coupled to the output capacitance C for providing an output voltage Vout. An output voltage detecting circuit VD is coupled to the converting circuit and generates a feedback signal VFB according to the output voltage Vout. The feedback circuit 10 generates a modulation signal Sp according to the feedback signal VFB and a reference signal Vr. The logic control circuit 20 generates control signals S1 and S2 according to the modulation signal Sp to respectively turn on/off the high-side transistor switch SW1 and the low-side transistor switch SW2. The over-voltage judgment circuit 15 receives the feedback signal VFB and an over-voltage reference signal Vov, and generates a high level signal when a level of the feedback signal VFB is higher than a level of the over-voltage reference signal Vov. At the moment, the latch protection circuit 25 immediately generates a latch signal LS when receiving the high level signal generated by the over-voltage judgment circuit 15 until the controller is restarted. The logic control circuit 20 stops generating the control signals S1 and S2 when receiving the latch signal LS, and turns off the high-side transistor switch SW1 and the low-side transistor switch SW2 of the converting circuit.

However, the controller immediately stops operation in some specific application environment, such as a remote control airplane, which would result in that the remote control airplane is out of control. The remote control airplane may crash if the controller cannot recover the power supplying system in a short time.

SUMMARY OF THE INVENTION

In view of the latching protection of the conventional controller that is not suitable for those need to continuously supply power, the present invention uses "soft-protection mechanism", which provides an effective protection for system and the power management Integrated Circuit as well as protects the system from damage. At the same time, due to the soft-protection mechanism, the system has enough response time for retrieving to normal operation.

To accomplish the aforementioned and other objects, an exemplary embodiment of the invention provides a controller for protectively reducing an output of a converting circuit, comprising a feedback circuit, a logic control circuit, an over-state judgment circuit and a protection control circuit. The feedback circuit generates a modulation signal in response to an output of a converting circuit. The logic control circuit is coupled to the feedback circuit and controls the converting circuit according to the modulation signal for stabilizing the output of the converting circuit. The over-state judgment circuit receives an over-state reference signal and a detecting signal, and generates a protection signal in response to levels of the over-state judgment signal and the detecting signal. The protection circuit is coupled to the logic control circuit and the over-state judgment circuit, and controls the logic control circuit for reducing the output of the converting circuit when receiving the protection signal.

An exemplary embodiment of the invention also provides a controller for protectively reducing an output of a converting circuit, comprising a feedback circuit, a logic control circuit, an under-state judgment circuit and a protection control circuit. The feedback circuit generates a modulation signal in response to an output of a converting circuit. The logic control circuit is coupled to the feedback circuit and controls the converting circuit according to the modulation signal for stabilizing the output of the converting circuit. The under-state judgment circuit receives an under-state reference signal and a detecting signal. The under-state judgment circuit executes a time-counting process when a level of the detecting signal is lower than a level of the under-state reference signal, and then generates a protection signal when the counted time reaches a predetermined time period. The protection control circuit is coupled to the logic control circuit and the under-state judgment circuit, and controls the logic control circuit to stop the converting circuit when receiving the protection signal.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
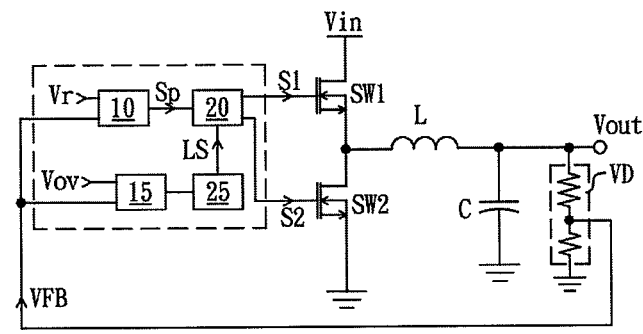
FIG. 1 is a schematic diagram of a conventional DC-DC buck converter.
Figure 2:
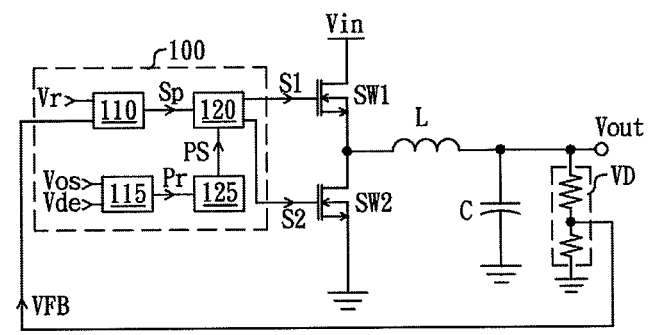
FIG. 2 is a block diagram of a DC-DC buck converter according to the present invention.

FIG. 2 is a block diagram of a DC-DC buck converter according to the present invention. The DC-DC buck converter comprises a controller 100 and a converting circuit, configured to provide an output to a load (not shown). The controller 100 comprises a feedback circuit 110, an error state judgment circuit 115, a logic control circuit 120 and a protection control circuit 125. The converting circuit comprises a high-side transistor switch SW1, a low-side transistor switch SW2, an inductance L, an output capacitance C. The high-side transistor switch SW1 and the low-side transistor switch SW2 are connected in series. One end of the high-side transistor switch SW1 is coupled to an input voltage Vin, the other end thereof is coupled to one terminal of the inductance L and one end of the low-side transistor switch SW2. The other end of the low-side transistor switch SW2 is grounded. The other terminal of the inductance L is coupled to the output capacitance C for providing an output voltage Vout. The feedback circuit 110 generates a modulation signal Sp according to a feedback signal VFB generated in response to an output of the converting circuit and a reference signal Vr. In the present embodiment, the feedback signal VFB is generated by an output voltage detecting circuit VD that is coupled to the converting circuit, so as to represent the output voltage Vout of the converting circuit. In other applications, the feedback signal VFB may represent an output current of the converting circuit. The logic control circuit 120 is coupled to the feedback circuit 110 and generates control signals S1 and S2 according to the modulation signal Sp to respectively control the high-side transistor switch SW1 and the low-side transistor switch SW2 for stabilizing the output voltage Vout of the converting circuit. The error state judgment circuit 115 receives an error state reference signal Vos and a detecting signal Vde, and accordingly generates a protection signal Pr when judging that the operation is abnormal. Wherein, the detecting signal Vde may be the feedback signal VFB mentioned above, the output current of the converting circuit, or the detecting signal of a voltage or a current at a node of the converting circuit. The protection control circuit 125 generates a temporary protection signal PS when receiving the protection signal Pr, and the logic control circuit 120 controls the converting circuit to reduce the output of the converting circuit. Thus, the load which is coupled to the converting circuit does not immediately stop operating under the converting circuit supplying a lower output. Hence, the present invention can avoid the system crashing damage due to latching protection.

Figure 3:
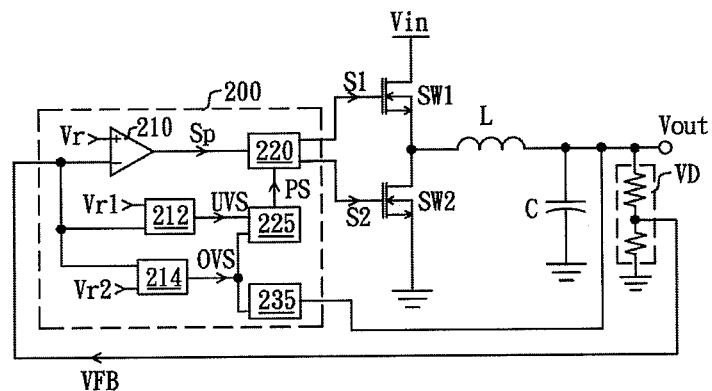
FIG. 3 is a schematic diagram of a DC-DC buck converter according to a first embodiment of the present invention.

FIG. 3 is a schematic diagram of a DC-DC buck converter according to a first embodiment of the present invention. The DC-DC buck converter comprises a controller 200 and a converting circuit, configured to provide an output voltage Vout to a load (not shown). The controller 200 comprises an error amplifier 210, an under-state judgment circuit 212, an over-state judgment circuit 214, a logic control circuit 220, a protection control circuit 225 and an energy discharging circuit 235. The converting circuit comprises a high-side transistor switch SW1, a low-side transistor switch SW2, an inductance L and an output capacitance C. The high-side transistor switch SW1 and the low-side transistor switch SW2 are connected in series. One end of the high-side transistor switch SW1 is coupled to an input voltage Vin, the other end thereof is coupled to one terminal of the inductance L and one end of the low-side transistor switch SW2. The other end of the low-side transistor switch SW2 is grounded. The other terminal of the inductance L is coupled to the output capacitance C for providing the output voltage Vout. An output voltage detecting circuit VD is coupled to an output of the converting circuit and generates a feedback signal VFB according to the output voltage Vout. The error amplifier 210 generates a modulation signal Sp according to a reference signal Vr and the feedback signal VFB. The logic control circuit 220 is coupled to the error amplifier 210 and generates control signals S1 and S2 according to the modulation signal Sp to respectively control the high-side transistor switch SW1 and the low-side transistor switch SW2 for stabilizing the output voltage Vout of the converting circuit.

Figure 3A:
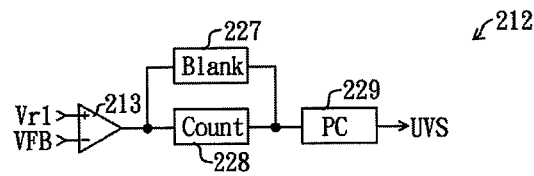
FIG. 3A is a schematic diagram of an under-state judgment circuit according to a preferred embodiment of the present invention.

FIG. 3A is a schematic diagram of an under-state judgment circuit according to a preferred embodiment of the present invention. Please also refer to FIG. 3, in the present embodiment, the under-state judgment circuit 212 is an under voltage judgment circuit, comprising an under voltage comparator 213, a blanking circuit 227, a counter 228 and a protection circuit 229. A non-inverting input end of the under voltage comparator 213 receives an under-state reference signal Vr1, and an inverting input end thereof receives the feedback signal VFB. The under voltage comparator 213 generates a high level signal when the output voltage Vout of the converting circuit is lower than a predetermined under voltage value, and stops generating the high level signal when the output voltage Vout returns to a value higher than the predetermined under voltage value. A level of the under-state reference signal Vr1 is lower than a level of the reference signal Vr shown in FIG. 3. For example, the level of the under-state reference signal Vr1 may be 0.5 times the level of the reference signal Vr. The counter 228 is coupled to the under voltage comparator 213 and executes a counting process according to a clock signal during a period of receiving the high level signal generated by the under voltage comparator 213. The counter 228 generates a high level signal to trigger the protection circuit 229 generating an under voltage protection signal UVS to the protection control circuit 225 when the counted clock number reaches a predetermined value (i.e. a predetermined time period). If the under voltage comparator 213 does not continue generating the high level signal for the predetermined time period, the counter 28 is reset. The blanking circuit 227 executes a signal blanking process when the controller 200 operates during a soft-start period. The counter 228 is blanked and can't generate a high level signal during the soft-start period. Thereby, the controller 200 can avoid an erroneous under voltage protection because the output voltage Vout may not rise to a level higher than the predetermined under voltage value during the soft-start period. The protection circuit 229 may be a latch circuit and is activated according to an enable signal or a power on reset signal, and executes a latching protection when the output voltage Vout is lower than the predetermined under voltage value. By the above-mentioned circuit structure, the protection circuit 229 delayed for a period of the time to execute the protection process when the under voltage is occurred. The load coupled to the converting circuit can not immediately stop operating, which can avoid the problem of immediately being out of control due to the latching protection in the prior art.

Figure 3B:
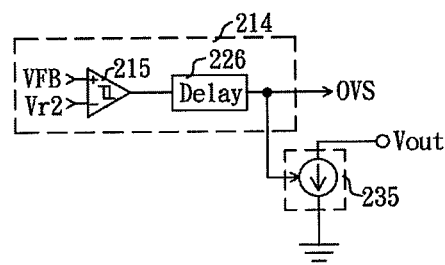
FIG. 3B is a schematic diagram of an over-state judgment circuit according to a preferred embodiment of the present invention.

FIG. 3B is a schematic diagram of an over-state judgment circuit according to a preferred embodiment of the present invention. Please also refer to FIG. 3, the over-state judgment circuit 214 is an over-voltage judgment circuit, which generates the protection signal when an output voltage of the converting circuit is higher than a first predetermined over-voltage value, and stops generating the protection signal when the output voltage is lower than a second predetermined over-voltage value. The first predetermined over-voltage value is greater than the second predetermined over-voltage value. More specifically, the over-state judgment circuit 214 comprises an over-voltage comparator 215 and a delay circuit 226. An inverting input end of the over-voltage comparator 215 receives an over-state reference signal Vr2, and a non-inverting input end thereof receives the feedback signal VFB. The over-voltage comparator 215 generates a high level signal when the output voltage Vout is higher than a predetermined over-voltage value. Wherein a level of the over-state reference signal Vr2 is higher than the level of the reference signal Vr. In the present embodiment, the over-voltage comparator 215 can be a hysteresis comparator. For example, the over-voltage comparator 215 generates the high level signal when the level of the feedback signal VFB is higher than that of 1.25 times the level of the reference signal Vr, and stops generating the high level signal when the level of the feedback signal VFB is lower than that of 1.05 times the level of the reference signal Vr. Herein, the controller 200 of the present invention can retrieve to the normal operation when a temporary over-voltage state is removed. The delay circuit 226 is coupled to the over-voltage comparator 215 and generates an over-voltage protection signal OVS when receiving the high level signal generated by the over-voltage comparator 215 for a delay time, for avoiding the error judgment of over-voltage because of noise.

Referring to FIG. 3, the protection control circuit 225 generates a temporary protection signal PS to the logic control circuit 220 for stopping generating the control signals S1 and S2 when receiving one of the over-voltage protection signal OVS and the under voltage protection signal UVS. After, the protection control circuit 225 stops generating the temporary protection signal PS if all the over-voltage protection signal OVS and under voltage protection UVS stop generating. At this time, the logic control circuit 220 retrieves to generate the control signals S1 and S2. The energy discharging circuit 235 directly connected to the output capacitance C of the converting circuit. The over-voltage protection signal OVS is simultaneously transmitted to the energy discharging circuit 235. The energy discharging circuit 235 provides an energy discharging path to discharge the electric energy stored by the output capacitance C when receiving the over-voltage protection signal OVS. Certainly, the energy discharging circuit 235 is not necessary for accomplishing the functions of the present invention. When the system is under over-voltage state, the controller of the present invention also can generate the control signal S2 to turn on the low-side transistor switch SW2 and achieve the function of reducing the output voltage Vout. However, when the low-side transistor switch SW2 is turned on, a current provided by the output capacitance C flows through the inductance L and so the inductance L stores partial electric energy discharged from the output capacitance C. That causes the unnecessary situation of the voltage or current oscillation. The extra energy discharging circuit 235 is used for avoiding the mentioned-above situation occurring.

Figure 4:
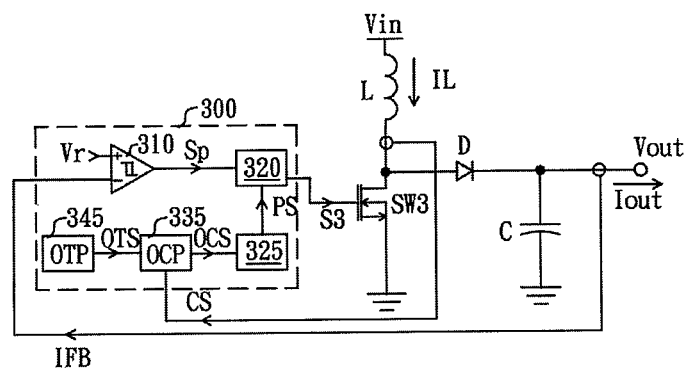
FIG. 4 is a schematic diagram of a DC-DC boost converter according to a second embodiment of the present invention.

FIG. 4 is a schematic diagram of a DC-DC boost converter according to a second embodiment of the present invention. The DC-DC boost converter comprises a controller 300 and a converting circuit, configured to provide an output current Iout to a load (not shown). The controller 300 comprises a ripple control circuit 310, an over-current judgment circuit 335, an over-temperature judgment circuit 345, a logic control circuit 320 and a protection control circuit 325. The converting circuit comprises a transistor switch SW3, an inductance L, a diode D and an output capacitance C. The inductance L and the transistor switch SW3 are connected in series. One terminal of the inductance L is coupled to an input voltage Vin, the other terminal thereof is coupled to a positive end of the diode D and one end of the transistor switch SW3. The other end of the transistor switch SW3 is grounded. A negative end of the diode D is coupled to the output capacitance C for providing an output current Iout. An input end of the ripple control circuit 310 is coupled to an output end of the converting circuit and generates a modulation signal Sp according to a feedback signal IFB representing the output current Iout and a reference signal Vr. The logic control circuit 320 is coupled to the ripple control circuit 310 and generates a control signal S3 according to the modulation signal Sp to control the transistor switch SW3 of the converting circuit for stabilizing the output current Iout of the converting circuit. The over-current judgment circuit 335 is coupled to the converting circuit and generates an over-current protection signal OCS when a current flowing through the converting circuit is higher than a first predetermined over-current value, and afterward stops generating the over-current protection signal OCS when the current flowing through the converting circuit is lower than a second predetermined over-current value. Wherein the first predetermined over-current value is greater than the second predetermined over-current value. The over-current protection signal OCS generated by the over-current judgment circuit 335 triggers the protection control circuit 325 to generate a temporary protection signal PS. The logical control circuit 320 stops generating the control signal S3 until an inductive current IL reduces to the second predetermined over-current value. Otherwise, the over-current judgment circuit 335 may stop generating the over-current protection signal OCS when the current flowing through the converting circuit is lower than the second predetermined over-current value and the output current Iout or the output voltage Vout of the converting circuit is lower than a predetermined value. Thus, it can ensure that the controller 300 operates again only after the energies stored in all the inductance and the converting circuit have reduced when being in an over-current abnormal state. The over-temperature judgment circuit 345 generates an over-temperature protection signal OTS for reducing the first predetermined over-current value and the second predetermined over-current value of the over-current judgment circuit 335 when an operation temperature of the controller 300 is higher than a first predetermined over-temperature value. Thus, it can reduce the heat generation due to current. Especially, the transistor switch SW3 is built in the controller 300, the controller 300 can quickly drop the operation temperature to be lower than a second predetermined over-temperature value. Either being in the over-current state or in the over-temperature state, the controller 300 of the present invention still continues controlling the converting circuit for providing the output to the load, and so the load maintains the operation for avoiding the problems of the systems being out of control and damaged.

Figure 4A:
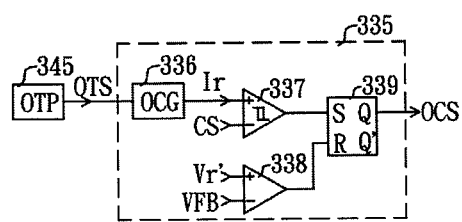
FIG. 4A is a schematic diagram of an over-current judgment circuit according to a preferred embodiment of the present invention.

FIG. 4A is a schematic diagram of an over-current judgment circuit according to a preferred embodiment of the present invention. In the present embodiment, the over-current judgment circuit 335 comprises an over-current reference signal generator 336, an over-current delay comparator 337, a protection reset comparator 338 and a SR flip-flop 339. The over-current reference signal generator 336 generates an over-current reference signal Ir. The over-current delay comparator 337 judges whether the inductive current IL is higher than the first predetermined over-current value or lower than the second predetermined over-current value according to the over-current reference signal Jr and a detecting signal CS. The over-current delay comparator 337 generates a high level signal to a set end S of the SR flip-flop 339 when the inductive current IL is higher than the first predetermined over-current value, and then the RS flip-flop 339 generates the over-current protection signal OCS. A non-inverting end of the protection reset comparator 338 receives a reset reference signal Vr', and an inverting end thereof receives the feedback signal VFB representative of an output voltage (not shown). When a level of the feedback signal VFB is lower than a level of the reference signal Vr', which shows that the power supplied by the converting circuit drops to a predetermined level, the protection reset comparator 338 generates a high level signal to a reset end R of the SR flip-flop 339 and then the SR flip-flop 339 stops generating the over-current protection signal OCS.

Figure 4B:
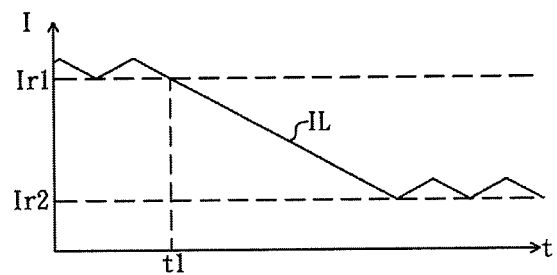
FIG. 4B is a waveform diagram of reducing an over-current judgment value when an over-temperature is occurred.

FIG. 4B is a waveform diagram of reducing an over-current judgment value when an over-temperature state is occurred. Also referring to FIG. 4A, the over-temperature judgment circuit 345 generates the over-temperature protection signal OTS to the over-current reference signal generator 336 when an over-temperature state is occurred at a time point t1. At this moment, the over-current reference generator 336 reduces a level of the over-current reference signal Ir from a first level value Ir1 to a second level value Ir2. Thus, the heat caused by current can be quickly reduced for removing the over-temperature abnormal state.

The aforementioned controllers of the present invention can reduce the output of the converting circuit when over-state abnormal situations are occurred, such as over-voltage, over-temperature and over-current. The controller may reduce the output of the converting circuit by means of at least one of reducing duty cycle, reducing output voltage, reducing output current, reducing operation frequency and so on. The controller of the present invention turns off the output of the converting circuit after a predetermined period of time when the under-voltage abnormal state occurs, instead of a conventional method of directly turning off the output of the converting circuit. Thus, the systems still can provide the under voltage protection.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A controller for protectively reducing an output of a converting circuit, the controller comprising:
    a feedback circuit, generating a modulation signal in response to an output of a converting circuit;
    a logic control circuit, coupled to the feedback circuit and controlling the converting circuit according to the modulation signal for stabilizing the output of the converting circuit;
    an over-state judgment circuit, receiving a detecting signal, and generating a protection signal when a level of the detecting signal is higher than a first predetermined value, and stopping generating the protection signal when the level of the detecting signal is lower than a second predetermined value, wherein the first predetermined value is larger than the second predetermined value; and
    a protection control circuit, coupled to the logic control circuit and the over-state judgment circuit and controlling the logic control circuit to reduce the output of the converting circuit when receiving the protection signal.

2. The controller according to claim 1, further comprising an energy discharging circuit which is coupled to the over-state judgment circuit, wherein the converting circuit has an output capacitance configured to store an electric energy for providing the output, and the energy discharging circuit is directly coupled to the output capacitance and provides an energy discharging path for discharging the electric energy stored by the output capacitance when receiving the protection signal.

3. The controller according to claim 2, wherein the over-state judgment circuit is an over-voltage judgment circuit, and the detecting signal is an output voltage of the converting circuit, and the first predetermined value is a first predetermined over-voltage value, and the second predetermined value is a second predetermined over-voltage value.

4. The controller according to claim 2, wherein the over-state judgment circuit is an over-temperature judgment circuit, and the detecting circuit is an operating temperature, and the first predetermined value is a first predetermined over-temperature value, and the second predetermined value is a second predetermined over-temperature value.

5. The controller according to claim 2, wherein the over-state judgment circuit is an over-current judgment circuit, and the detecting signal is a current of the converting circuit, and the first predetermined value is a first predetermined over-current value, and the second predetermined value is a second predetermined over-current value.

6. The controller according to claim 5, further comprising an over-temperature judgment circuit, which reduces the first predetermined over-current value and the second predetermined over-current value when an operating temperature of the controller is higher than a first predetermined over-temperature value, and stops reducing the first predetermined over-current value and the second predetermined over-current value when the operating temperature of the controller is lower than a first predetermined over-temperature value.

7. The controller according to claim 1, wherein the over-state judgment circuit is an over-voltage judgment circuit, and the detecting signal an output voltage of the converting circuit, and the first predetermined value is a first predetermined over-voltage value, and the second predetermined value is a second predetermined over-voltage value.

8. The controller according to claim 1, wherein the over-state judgment circuit is an over-temperature judgment circuit, and the detecting signal is an operating temperature, and the first predetermined value is a first predetermined over-temperature value, and the second predetermined value is a second predetermined over-temperature value.

9. The controller according to claim 1, wherein the over-state judgment circuit is an over-current judgment circuit, and the detecting circuit is a current of the converting circuit, and the first predetermined value is a first predetermined over-current value, and the second predetermined value is a second predetermined over-current value.

10. The controller with according to claim 9, further comprising an over-temperature judgment circuit, which reduces the first predetermined over-current value and the second predetermined over-current value when an operating temperature of the controller is higher than a first predetermined over-temperature value, and then stops reducing the first predetermined over-current value and the second predetermined over-current value when the operating temperature of the controller is lower than a second predetermined over-temperature value, wherein the first predetermined over-temperature value is greater than the second predetermined over-temperature value.

11. A controller for protectively reducing an output of a converting circuit, the controller comprising:
   a feedback circuit, generating a modulation signal in response to an output of a converting circuit;
   a logic control circuit, coupled to the feedback circuit and controlling the converting circuit according to the modulation signal for stabilizing the output of the converting circuit;
   an under-state judgment circuit, receiving an under-state reference signal and a detecting signal, executing a time-counting process when a level of the detecting signal is lower than a level of the under-state reference signal, and generating a protection signal when the counted time reaches a predetermined time period; and
   a protection control circuit, coupled to the logic control circuit and the under-state judgment circuit, and controlling the logic control circuit to stop the converting circuit when receiving the protection signal.

12. The controller according to claim 11, wherein the under-state judgment circuit is an under voltage judgment circuit, which generates the protection signal when an output voltage of the converting circuit is lower than a predetermined under voltage value.

13. The controller according to claim 12, wherein the under-state judgment circuit further comprises a blanking circuit which stops the under-state judgment circuit to generate the protection signal during a soft-start period time of the controller.

14. The controller according to claim 11, wherein the under-state judgment circuit further comprises a blanking circuit which stops the under-state judgment circuit to generate the protection signal during a soft-start period time of the controller.

* * * * *